US006630926B2

United States Patent
Challener et al.

(10) Patent No.: US 6,630,926 B2
(45) Date of Patent: Oct. 7, 2003

(54) APPARATUS AND METHOD FOR VERIFYING KEYSTROKES WITHIN A COMPUTING SYSTEM

(75) Inventors: David Carroll Challener, Raleigh, NC (US); Richard Alan Dayan, Wake Forest, NC (US)

(73) Assignee: International Business Machines Corporation, Armonk, NY (US)

( * ) Notice: Subject to any disclaimer, the term of this patent is extended or adjusted under 35 U.S.C. 154(b) by 267 days.

(21) Appl. No.: 09/732,351

(22) Filed: Dec. 7, 2000

(65) Prior Publication Data

US 2002/0070920 A1 Jun. 13, 2002

(51) Int. Cl.$^7$ .......................... G09G 5/00; G06F 13/22; H03K 17/94
(52) U.S. Cl. .......................... 345/168; 341/22; 710/220
(58) Field of Search ................................. 345/156, 168, 345/169, 172; 341/22, 24; 710/220, 260

(56) References Cited

U.S. PATENT DOCUMENTS

| | | | |
|---|---|---|---|
| 4,234,933 A | * 11/1980 | Adelson et al. .............. | 345/732 |
| 4,410,957 A | 10/1983 | Cason et al. ................. | 364/900 |
| 4,942,606 A | 7/1990 | Kaiser et al. ................ | 340/825 |
| 5,038,275 A | * 8/1991 | Dujari .......................... | 710/19 |
| 5,097,506 A | * 3/1992 | Kaiser et al. ................ | 713/202 |
| 5,485,614 A | 1/1996 | Kocis et al. ................. | 361/680 |
| 5,557,686 A | 9/1996 | Brown et al. ................ | 382/115 |
| 5,584,028 A | * 12/1996 | Shrock ........................ | 710/262 |
| 5,642,110 A | * 6/1997 | Raasch et al. .............. | 238/379 |
| 5,812,864 A | 9/1998 | McCoy et al. ............... | 395/800 |
| 5,850,536 A | 12/1998 | McLain, Jr. ................. | 395/500 |
| 6,011,554 A | 1/2000 | King et al. .................. | 345/352 |
| 6,020,886 A | 2/2000 | Jacober et al. .............. | 345/338 |

OTHER PUBLICATIONS

Scott Mueller, Upgrading and Repairing PCS, Que Corporation, 1999, pp. 267, 312–315, 366, 910–911.
Peter Norton and John Goodman, Inside the PC, Eighth Edition, SAMS Publishing, 1999, pp. 100–101, 919–194, 342–344.
Bryan Pfaffenberger, Running Microsoft Internet Explorer, Microsoft Press, 1999, pp. 228–232.
Wynn L. Rosch, Hardware Bible, Premier Edition, SAMS Publishing, 1997, pp. 274–275, 293, 652–670.
Tom Sheldon, Encyclopedia of Networking, Electronic Edition, Osborne/McGraw–Hill, pp. 137–139, 773.
Anthony Stirk, Back Orifice, published at http://www.irchelp.org/irchelp/security/bo.html.
Internet Security Systems, Alerts, published at http://xforce.iss.net/alert/advise31.php.

* cited by examiner

Primary Examiner—Richard Hjerpe
Assistant Examiner—Duc Q Dinh
(74) Attorney, Agent, or Firm—John D. Flynn; Ronald V. Davidge

(57) ABSTRACT

A computing system includes a security register, in which a flag bit is set whenever a clock pulse and scan code are transmitted from the microcontroller in the system keyboard. The presence of this flag bit indicates that an associated code, which is stored in an output buffer of the keyboard/auxiliary device controller of the system has been sent by the keyboard, as a result of a keystroke, instead of by a program executing within the CPU of the system. The security register is read and reset as the associated code is read from the output buffer. An application program can use the data from the security register to determine if data has come from the surreptitious entry of data through keystroke emulation.

10 Claims, 1 Drawing Sheet

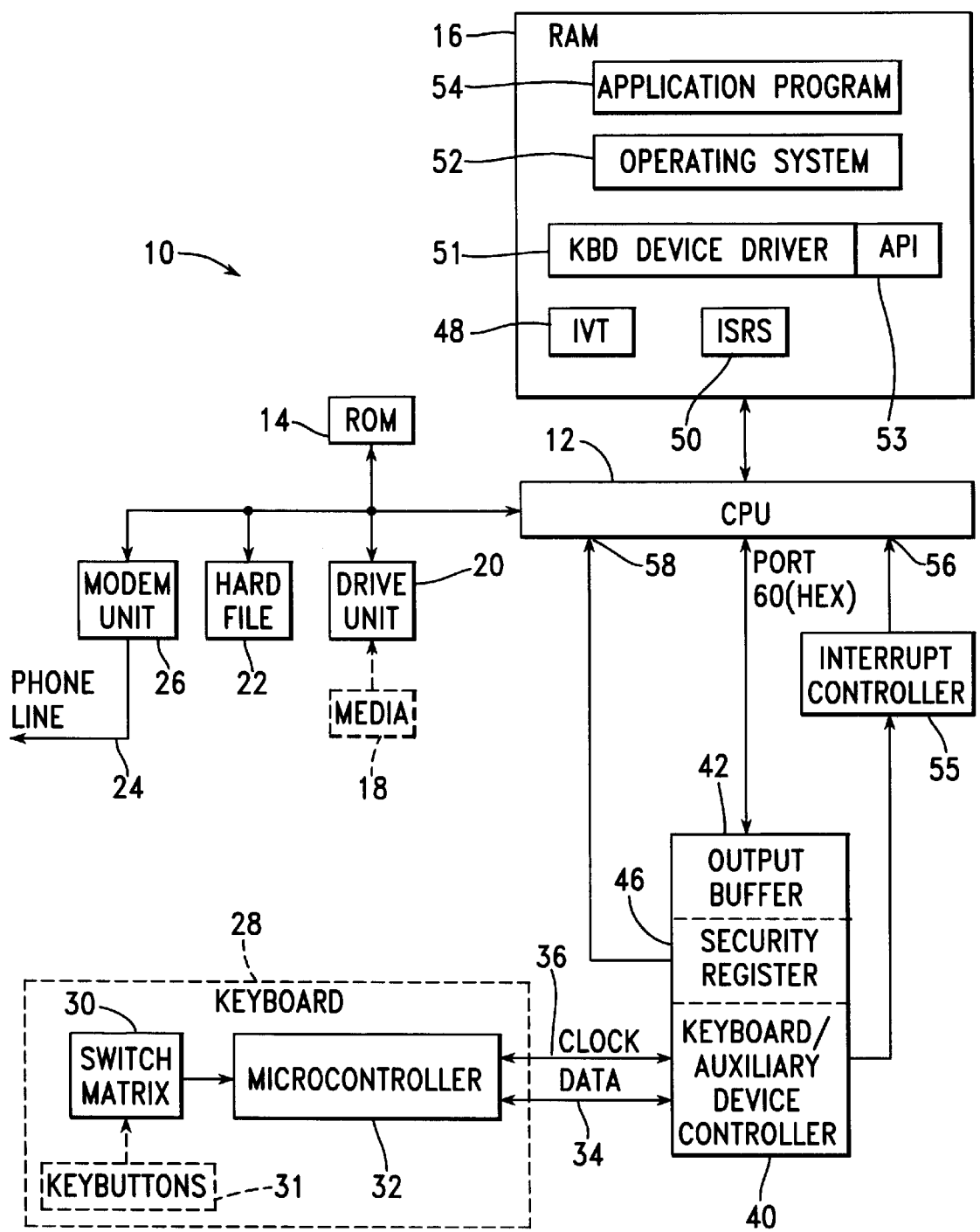

APPARATUS AND METHOD FOR VERIFYING KEYSTROKES WITHIN A COMPUTING SYSTEM

CROSS-REFERENCE TO A RELATED APPLICATION

BACKGROUND INFORMATION

1. Field of Invention

This invention relates to preventing the emulation of keyboard operation by a program executing within a computing system without the knowledge or consent of the user of the computing system, and, more particularly, to determining whether a character code stored within the output buffer of a keyboard/auxiliary device controller is a result of a keyboard keystroke or of an attempt at such an emulation.

2. Background Art

A conventional computing system includes a keyboard/auxiliary device controller having a keyboard output buffer in which a scan code is placed as a result of a keystroke (i.e., as a result of the depression or release of a keyboard key). The data stored in this output buffer is accessed by various application programs executing within the computing system to determine the input provided by the person using the computing system. Data can also be written to the keyboard output buffer from the processor within the computing system for subsequent transmission to the keyboard. The data and clock lines connecting the keyboard with the keyboard/auxiliary device controller are driven by tri-state logic allowing both ends of the lines to vary the level of the signal so that data can be sent in either direction. For example, commands are sent to the keyboard to control the illumination of the keyboard indicators for Num Lock, Caps Lock, and Scroll Lock, and to control keyboard functions, such as typematic keys.

Since the processor within the computing system has a capability of writing data to the keyboard output buffer, codes representing characters available on the keyboard may also be sent to the keyboard output buffer from the processor within the computing system. These codes are then read by the processor within the computing system and acted upon as if they were supplied by the system user through the keyboard. This capability has been used by routines testing certain system functions, and may be used for other legitimate purposes such as the implementation of application macro programs emulating keystrokes. However, this capability has also been used surreptitiously to obtain control of a computing system in a manner allowing a remote user to gather information, reconfigure the system, and operate the system according to commands typed by the remote user. A routine for gaining control of a computer in this way is typically a part of a "Trojan horse" program, which is disguised as a game, utility, or other application to be downloaded or otherwise installed by an unknowing user. Alternately, such a routine may be part of a "back door" program surreptitiously installed by an intruder on a computer left unattended or left behind by a disgruntled employee to gain future access to the computing system.

Back Orifice is a notorious example of a client/server application which has been surreptitiously installed on a computing system to gain control of the system from a remote location. This application is generally distributed in the form of a Trojan horse program, which provides the remote user with over seventy commands for gathering information and sending instructions to the computing system, which acts as a server. These commands include "List Passwords," which retrieves a list of users and passwords, and "Log Keystrokes," which logs keystrokes to a file entered with the command as a parameter.

While a Trojan horse or back door program gaining access to a computing system and operating the system under the control of a remote user can do damage in a number of ways, particularly serious consequences can be expected to result from the use of the system to transmit messages and make transactions in a manner indicating that the transmissions and transactions are being made with the consent of the user of the computing system.

A number of computing system applications rely upon passwords and personal identification numbers (PINs) to establish whether the person using the computing system has the authority to access certain information or to perform certain actions through the computing system. Various types of stored information, from trade secrets of various businesses to top secret defense information are protected, at least in part, through the use of passwords. PINs are typically used to provide access to bank account information and to provide for the electronic transfer of funds from one account to another. Furthermore, PINs and passwords are used with personal certificates to identify the individual sending a message. In a number of types of communication, the proper identification of the person sending a message is crucial to prevent message forgery. For example, a slanderous message may be sent by one person and attributed to someone else. Also, the most common types of credit card fraud do not involve stealing credit card numbers over the Internet, but rather stealing the cards themselves or otherwise copying the numbers for misuse. While such stolen credit card numbers may then be used to make purchases over the Internet, such use can be thwarted by requiring the use of a personal certificate to identify the purchaser. To obtain a personal certificate, an individual contacts a certificate authority, such as VeriSign, Inc., providing information including a password chosen by the individual for use with the certificate. A message is then returned by e-mail, including a PIN, which is subsequently used by a web browser, such as Microsoft INTERNET EXPLORER, to install data representing the certificate on the individual's system.

Thus, it is understood that a Trojan horse or back door program obtaining control of a computing system can be expected to obtain passwords and PIN numbers from the computing system and, when possible, to additionally use these passwords and PIN numbers and, when possible, other information, such as the numbers of stolen credit cards, to make fraudulent financial transactions and to transmit fraudulent personal certificates. Since this can be accomplished by writing codes to the keyboard output buffer in a manner causing the computing system to act as if the codes have been provided as inputs from the computing system user through the keyboard, what is needed is a way to allow differentiation, within an application program executing within the computing system, between codes placed in the keyboard output buffer through use of the keyboard and codes placed in this buffer from any other source.

SUMMARY OF THE INVENTION

A first objective of the present invention is to provide a method for detecting, within a computing system, whether a code stored in the keyboard register has been generated in response to a user keystroke or in response to other means, such as an attempted emulation of a keyboard keystroke.

A second objective of the present invention is to provide an interface to an application program executing within a computing system, with the interface indicating whether a character placed in the keyboard register has been generated in response to a user keystroke or in response to other means.

In accordance with a first aspect of the present invention a method is provided for providing a code resulting from a depression of a keybutton in a keyboard of a computing system and for providing data indicating that the code has resulted from the depression of a keybutton to a program executing within the computing system, wherein the method includes operating a switch within a switch matrix in response to depression of the keybutton; generating a first code in response to operating the switch; transmitting the first code and a clock pulse; receiving the first code and the clock pulse; storing a second code in an output buffer and a flag bit in a security register in response to receiving the clock pulse and the first code; reading the security register; reading the second code from the output buffer; and resetting the security register.

BRIEF DESCRIPTION OF THE DRAWINGS

The FIGURE is a block diagram of a computing system built in accordance with the present invention.

DESCRIPTION OF THE INVENTION

Referring to the FIGURE, a computing system 10, built in accordance with the present invention, includes a processor (CPU) 12 having access to data stored in a read-only memory (ROM) 14 and having an ability to read information from, and write information to, a random access memory (RAM) 16. Preferably, the CPU 12 additionally has an ability to read information from, and write information to, a computer readable medium 18 within a drive unit 20 configured for reading and writing upon such a medium. For example, the medium 18 may be a floppy disk.

Also, the CPU 12 may have an ability to read information from, and write information to, a hard file 22, and to receive information from, and to write information to, a communications channel, such as a telephone line 24, through a modem 26. In the above description "information" is assumed to include both data and instructions for a program which may be executed within the CPU 12. The various devices described above are conventionally connected to the CPU 12 through one or more buses and through associated controllers, which are not shown because of their conventional nature and because the present invention operates independently from the details of their construction and operation.

Inputs to the computing system 10 from the system user are provided through a keyboard 28, which may also be a conventional device. The keyboard 28 includes a switch matrix 30, which provides signals indicating when a keybutton within a number of keybuttons 31 is depressed and released, and a microcontroller 32, which generates scan codes transmitted in a serial manner along a DATA line 34. The microcontroller 32 is, for example, an Intel 8048 or 8049 microcontroller or a Motorola 6805 microcontroller. With each transmission of a scan code along the DATA line 34 from the microcontroller 32, a pulse is sent along the CLOCK line 36. A different first scan code results from the depression of each key button operating the switch matrix 30, and a different second scan code results from the release of each such key button after it is depressed. For example, the DATA and CLOCK lines 34, 36 form a serial data link transferring data in 11-bit packets of information.

A keyboard/auxiliary device controller 40, which is also connected to the DATA and CLOCK lines 34, 36, operates generally as an Intel 8042 controller, being typically placed on the main system board of the computing system 10. When the keyboard/auxiliary device controller 40 receives a code from the microcontroller 32, the controller 40 stores the code in a keyboard output buffer 42. When a code is stored in the keyboard output buffer 42, the keyboard/auxiliary device controller 40 generates an interrupt request signal IRQ1 to signal the CPU 12 that such data is available.

In accordance with the present invention, the keyboard/auxiliary device controller 40 also includes a security register 46, which is set to store a flag bit whenever this controller 40 stores a code within the output buffer 42 in response to a code transmitted from the microcontroller 32 in the keyboard 28. After the security register 46 is set, the flag bit can be read by the CPU 12. When the output buffer 42 is read, the security register 46 is reset, erasing the flag bit if it is present.

The RAM 16 stores instructions for a number of programs or routines which can be executed within the CPU 12, along with various forms of data. Included within this stored information is an interrupt vector table (IVT) 48 and a number of interrupt service routines (ISRs) 50 and a keyboard device driver routine 51. During an initialization sequence following power-on of the computing system 10, a portion of the IVT 48, including an interrupt vector used to service an interrupt from the keyboard/auxiliary device controller 40, is loaded to the RAM 16 from ROM 14. The RAM 16 also includes instructions for an operating system 52, such as a version of Microsoft WINDOWS, DOS, or UNIX. If the operating system 52 is DOS, the ISRs 50 are also loaded during initialization from ROM 14, and the keyboard device driver routine 51 is loaded from the hard file 22. If the operating system 52 is a version of WINDOWS, the ISRs 50 and part of the keyboard device driver 51 are loaded during initialization from the operating system 52. If the operating system 52 is UNIX, the ISRs 50 are part of the keyboard device driver 51, which is loaded from the operating system 52 during initialization. If the operating system 52 is WINDOWS OR UNIX, the RAM 16 also stores an Application Program Interface (API) 53 associated with the keyboard device driver 51, which is loaded with the keyboard device driver 51. The API 53 provides an interface that an application program 54, which is also stored in RAM 16 for typical operation of the computing system 10, uses to request and carry out services performed by the operating system 52.

The RAM 16 also stores an application program 54. While the operating system 52 and the application program 54 are shown within RAM 16, where their instructions and data are available for execution within the CPU 12, these programs 52, 54 are typically stored within the hard file 22, being loaded into RAM 16 during the initialization, or "boot," sequence following power-on of the computing system 10. These programs 52, 54 and other programs are also typically installed on the hard file unit 22 from computer readable media 18 read within drive unit 20. Some or all of such programs may alternately be downloaded for installation on the hard file unit 22 from signals received over the transmission line 24 through the modem 26.

The interrupt request signal IRQ1 is sent from the keyboard/auxiliary device controller 40 to an interrupt controller 55, which may also be a conventional controller mounted on the main system board. Other types of interrupts are also sent to the interrupt controller 55 from other hardware devices (not shown) within the computing system 10. The interrupt controller 55 signals the CPU 12 over an interrupt input line 56, indicating that a hardware interrupt has occurred. The IVT 48 includes a number of entries, each of which corresponds to a particular interrupt request signal, and each of which includes an address pointing to a particular ISR 50, which is a routine used to service the particular interrupt. Thus, in response to the interrupt request signal IRQ1, the system reads the address stored in the IVT 48 at a location corresponding to IRQ1, and then begins executing instructions for an ISR 50 located by this address. This ISR 50 causes the CPU 12 to read, the code stored in the output buffer 42 through I/O PORT 60(Hex).

In accordance with the present invention, the ISR 50 associated with IRQ1 causes the CPU 12 to read the security register 46 through another I/O port 58 before reading the output buffer 42. The subsequent process of reading data within the output buffer 42 through I/O PORT 60(Hex) also causes the security register 46 to be reset. Thus, while various routines executing within the computing system 10 may be conventional, it is understood that this ISR 50 and the keyboard device driver routine 51 are modified, in comparison to conventional versions of these routines, to provide for the additional reading of data within the security register 46, and for making such data available to the application program 54 executing within the CPU 12, along with the data read from the output buffer 42. It is also understood that the API 53 of the keyboard device driver 51 is modified, in comparison to a conventional version of this routine, to make the results of reading the security register 46 available to the application program 54 executing within the CPU 12, along with the results of reading the output buffer 42.

The computing system 10 preferably provides for conventional signaling and "handshaking" processes occurring between the CPU 12 and the keyboard 28. The CPU 12 can write to the output buffer 42 through I/O PORT 60(Hex), and the keyboard/auxiliary device controller 40 transmits various commands written to the output buffer 42 from the CPU 12 to the microcontroller 32 in the keyboard 28. The devices at each end of the DATA and CLOCK lines 34, 36 use tri-state logic, so that both ends of the lines can vary the level of the signal on the lines 34, 36. For example, the keyboard 28 may include Scroll Lock, Num Lock, and Caps Lock lights used to indicate the status of associated functions, with these lights being turned on and off by means of commands transmitted from the CPU 12 to the microcontroller 32. Such commands may also be used to set typematic functions to occur within the keyboard 28, so that multiple codes are transmitted from the keyboard 28 as an individual keybutton is held down.

Two-way communications between the keyboard/auxiliary device controller 40 and the keyboard microcontroller 32 are established, for example, by holding the CLOCK line 36 at a high level, with a voltage from the keyboard 28, unless this line is pulled low by either the keyboard microcontroller 32 or by the keyboard/auxiliary device controller 40 to send a pulse in either direction. The keyboard microcontroller 32 monitors the CLOCK and DATA lines 36, 34, sending data to the keyboard/auxiliary device controller 40 only when both of these lines are high. If the CLOCK line 36 is pulled low by the keyboard/auxiliary device controller 40, the microcontroller 32 holds characters within its buffer instead of sending them. If the CLOCK line 36 is high while the DATA line 34 is held low by the keyboard/auxiliary device controller 40, the keyboard microcontroller 32 waits to receive a command sent by this controller 40.

The CPU 12 can also write a code representing a character which could be provided as an input from the keyboard 28 to the output buffer 42 through I/O PORT 60(Hex). Conventionally, this capability causes an application program 54 to react to the code as if it had been provided as an input from the keyboard 28. This capability has been used to provide for various forms of system testing, and it may be used in other ways, such as in the execution of macro programs under control of the application program 54. However, this capability can also be seriously abused by a Trojan horse program or a back door program executing within the CPU 12, with codes written to the output buffer 42 under control of the program being used surreptitiously to gain control of the computing system 10 and to operate the computing system 10 by commands from a remote terminal.

Therefore, in accordance with the present invention, the security register 46 is used to provide a means for determining whether a code stored in the output buffer 42 is the result of the depression of a keybutton to close a switch within the switch matrix 30 of the keyboard 28, or the result of another operation, such as writing the code from the CPU 12 to the output buffer 42. Specifically, each time a code is written to the output buffer 42 as a result of a transmission from the microcontroller 32 of the keyboard 28, the keyboard/auxiliary device controller 40 sets the security register 46 to contain a flag bit. When the output buffer 42 and the security register 46 are both read, as described above, the contents of the security register 46 can be used to determine whether the code stored in the output buffer 42 has been sent from the keyboard 28. If this security register 46 has been set, this code has been sent from the keyboard 28; otherwise it is the result of another type of operation, such as the writing of a code to the output buffer 42 from the CPU 12. Since the security register 46 is always read when the output buffer 42 is read, and since the process of reading the security register 46 causes this register 46 to be reset, this register 46 is reset each time the output buffer 42 is read. Since the security register 46 is only set when the keyboard/device controller 40 determines that a pulse has been sent on the CLOCK line 36 from the microcontroller 32 in the keyboard 28, a program executing in the CPU 12 cannot set this register 46 without an input from the keyboard 28.

While the data from the security register 46 is preferably always provided through the API 53 of the keyboard device driver to an application program 54 executing within the CPU 12, the application program 54 can determine whether to use this data. Such a determination may be based on the context of operation of the application program 54. For example, the application program 54 can use data from the security register 46 to prevent responding to an input of a password or PIN number, unless the password or PIN number is provided as a result of operation of the keyboard 28. Such an application program 54 may otherwise accept and act upon input data provided through the output buffer 42 regardless of the condition of the security register 46. Alternately, the application program 54 may use the condition of the security register 46 to prevent the transmission of data over a secure sockets layer, when such data has not been derived from operation of the keyboard 28.

While the use of the present invention has been described in relation to an application program 54 operating through an API 53, it is understood that the present invention can also be used by a subroutine executing as part of the operating system 52. In particular, the present invention may be used in this way to prevent an unauthorized transfer of data in response to inputs from a Trojan horse or back door program executing surreptitiously within the processor 12.

While the present invention has been described in its preferred form or embodiment with some degree of particularity, it is understood that this description has been given only by way of example and that numerous changes in the details of construction, fabrication, and use, including changes in the combination and arrangement of parts, may be made without departing from the spirit and scope of the invention.

What is claimed is:

1. A method for providing a code resulting from a depression of a keybutton in a keyboard of a computing system and for providing data indicating that said code has resulted from said depression of a keybutton to a program executing within said computing system, wherein a CPU within said computing system has an ability to write a code to an output buffer, and wherein said method comprises:

operating a switch within a switch matrix in response to depression of said keybutton;

generating a first code in response to operating said switch;

transmitting said first code and a clock pulse;

receiving said first code and said clock pulse;

storing a second code in said output buffer and a flag bit in a security register in response to receiving said clock pulse and said first code, wherein said flag bit is not set in response to writing a code in said output buffer by said CPU;

reading said security register;

reading said second code from said output buffer;

providing data indicating whether said flag bit has been set to said program executing within said computing system; and resetting said security register.

2. The method of claim 1, wherein said first code is generated in a microcontroller, said second code is stored in said output buffer by a keyboard controller, said first code is transmitted along a serial data line between said microcontroller and said keyboard controller, and said clock pulse is transmitted along a clock line between said microcontroller and said keyboard controller.

3. The method of claim 2, additionally comprising generating an interrupt request signal within said keyboard controller after storing said second code in said output buffer, wherein said output buffer and said security register are read in response to an interrupt service routine executing in response to said interrupt request signal.

4. The method of claim 1, additionally comprising providing said second code and said flag bit to said program executing in said computing system through application program interface routines executing in said computing system.

5. A method for determining whether a code stored within an output buffer within a computing system has been stored as a result of a keyboard keystroke or as a result of transmission of said code from a CPU within said computing system, wherein said method comprises:

storing a flag bit within a security register in response to a clock pulse and a scan code transmitted following said keyboard keystroke;

reading said security register when said output buffer is read;

determining that said code stored within said output buffer has been stored as a result of a keyboard keystroke when said flag bit is present within said security register;

determining that said code stored within said output buffer has been stored as a result of transmission of said code from said CPU when said flag bit is not present within said security register; and resetting said security register when said output buffer is read.

6. The method of claim 5, wherein said output buffer and said security register are read by said CPU in accordance with an interrupt service routine executing within said CPU, and said code stored within said output buffer is determined to have been stored as a result of a keyboard keystroke or as a result of transmission of said code from said CPU in accordance with an application program executing within said CPU.

7. A computer system comprising:

a keyboard including a plurality of keybuttons, a plurality of switches, wherein each switch within said plurality of switches is operated in response to depression of a keybutton in said plurality of keybuttons, and a microcontroller transmitting a scan code and a clock pulse in response to operation of each switch within said plurality of switches;

an output buffer;

a keyboard controller receiving said scan code and said clock pulse, writing a first code to said output buffer in response to said scan code, and generating an interrupt request;

a CPU writing a second code to said output buffer;

a security register, storing a flag bit set by said keyboard controller in response to receiving said clock pulse and said scan code from said microcontroller, wherein said flag bit is not set by said CPU writing said second code to said output buffer, and wherein said security register is reset to erase said flag bit in response to reading said output buffer;

a memory storing an interrupt service routine executed in response to said interrupt request, causing said CPU to read said security register and said output buffer.

8. The computer system of claim 7, wherein said memory additionally stores an application program for execution within said CPU, and said application program executing within said CPU causes said CPU to determine that a code stored within said output buffer has been stored in response to depression of a keybutton within said plurality of keybuttons in response to said interrupt service routine reading said flag bit in said security register.

9. The computer system of claim 8, wherein said application program executing within said CPU additionally causes said CPU to determine that a code stored within said output buffer has written to said output buffer from said CPU in response to a determination by said interrupt service routine that said flag bit has not been set in said security register.

10. A computer readable medium storing an interrupt service routine for execution within a computer system in response to an interrupt indicating a code has been stored within a keyboard output buffer, wherein:

said interrupt service routine reads a code stored within a security register and said code stored in said keyboard output buffer, said code is stored within said security register by a keyboard controller in response to receiving a clock pulse and a scan code from a microcontroller in a keyboard, said code is not stored within said security register in response to a CPU writing data to said keyboard output buffer, and said security register is reset in response to said CPU reading said keyboard output buffer.

* * * * *